(12) United States Patent
Ichikawa et al.

(10) Patent No.: US 7,695,796 B2
(45) Date of Patent: Apr. 13, 2010

(54) HONEYCOMB STRUCTURAL BODY AND METHOD OF MANUFACTURING THE SAME

(75) Inventors: Yukihito Ichikawa, Nagoya (JP); Sadaaki Hirai, Nagoya (JP)

(73) Assignee: NGK, Insulators, Ltd., Nagoya (JP)

( * ) Notice: Subject to any disclaimer, the term of this patent is extended or adjusted under 35 U.S.C. 154(b) by 1386 days.

(21) Appl. No.: 10/532,758

(22) PCT Filed: Sep. 7, 2004

(86) PCT No.: PCT/JP2004/012975

§ 371 (c)(1),
(2), (4) Date: Apr. 27, 2005

(87) PCT Pub. No.: WO2005/025720

PCT Pub. Date: Mar. 24, 2005

(65) Prior Publication Data

US 2006/0168908 A1     Aug. 3, 2006

(30) Foreign Application Priority Data

Sep. 12, 2003     (JP) .............................. 2003-321914

(51) Int. Cl.
*B32B 3/12* (2006.01)
*B01D 39/14* (2006.01)
(52) U.S. Cl. .......................... 428/116; 428/117; 55/524
(58) Field of Classification Search ................ 428/116, 428/117; 55/524
See application file for complete search history.

(56) References Cited

U.S. PATENT DOCUMENTS

| | | | |
|---|---|---|---|
| 4,840,827 A * | 6/1989 | Mizutani et al. ............ | 428/116 |
| 5,188,779 A | 2/1993 | Horikawa et al. | |
| 5,629,067 A | 5/1997 | Kotani et al. | |
| 6,428,755 B1 * | 8/2002 | Rao et al. ................... | 422/180 |
| 2001/0033910 A1 | 10/2001 | Ikeshima | |
| 2006/0105139 A1 | 5/2006 | Suwabe et al. | |
| 2007/0158879 A1 | 7/2007 | Suwabe et al. | |

FOREIGN PATENT DOCUMENTS

| | | |
|---|---|---|
| EP | 0 449 556 A2 | 10/1991 |
| EP | 0 554 104 A2 | 8/1993 |
| EP | 1 138 389 A1 | 10/2001 |
| EP | 1 533 032 A1 | 5/2005 |
| JP | U 63-144836 | 9/1988 |
| JP | A 3-275309 | 12/1991 |
| JP | A 5-269388 | 10/1993 |
| JP | A 2001-261428 | 9/2001 |
| JP | A 2004-75524 | 3/2004 |
| JP | A 2004-175654 | 6/2004 |
| WO | WO 03/106028 | 12/2003 |

* cited by examiner

*Primary Examiner*—Timothy M Speer
*Assistant Examiner*—Gordon R Baldwin
(74) *Attorney, Agent, or Firm*—Oliff & Berridge, PLC

(57) ABSTRACT

There are provided a honeycomb structure and a method of manufacturing the honeycomb structure, the honeycomb structure including a honeycomb structural part, which has partition walls 2 for forming a plurality of cells 3 partitioned in a honeycomb shape and for forming recesses 6 on an outer peripheral surface, and an outer wall part 5 disposed on the outer peripheral surface of the honeycomb structural part, wherein voids are formed in the recesses 6 between the outer wall part 5 and the honeycomb structural part. The honeycomb structure and the method of manufacturing the same can suppress the reduction of a temperature increasing speed while suppressing a decrease of mechanical strength and further can suppress the occurrence of cracks.

7 Claims, 7 Drawing Sheets

VIIb

HONEYCOMB STRUCTURAL BODY AND METHOD OF MANUFACTURING THE SAME

TECHNICAL FIELD

The present invention relates to a honeycomb structure having a honeycomb structural part having a partition wall which forms cells each functioning as a fluid passage and an outer wall part so as to cover an outer peripheral part of the honeycomb structural part, and a method for production thereof.

BACKGROUND ART

To cope with the auto-emission control which is made stricter with each passing year, there is recently used a catalyst-carrying honeycomb structure to eliminate nitrogen oxides, sulfur oxides, hydrogen chlorides, hydrocarbons, carbon monoxide, and the like contained in auto exhaust fumes. Further, the honeycomb structure is also used as a filter for capturing micro particles exhausted from diesel engines.

For example, since a catalyst used in the catalyst-carrying honeycomb structure is ordinarily more activated in a high temperature region, a vehicle is driven in the state in which the catalyst is less activated during the period from the start of the vehicle to the time at which the temperature of the honeycomb structure is increased, thereby insufficiently purified fumes are exhausted. Accordingly, the period of time during which the vehicle is driven at a low temperature of the honeycomb structure must be shortened as much as possible. One of methods for this purpose is to increase the temperature of the honeycomb structure in a short time from the start of the vehicle by reducing the heat capacity of the honeycomb structure. To reduce the heat capacity of the honeycomb structure, the weight (the density) of the honeycomb structure must be reduced without modifying the geometrical surface area thereof, and there is a method of reducing the thickness of partition walls and increasing a porosity for this purpose. However, the mechanical strength of the honeycomb structure is reduced by reducing the density thereof by reducing the wall thickness and increasing the porosity.

Further, a honeycomb structure for purifying a large flow amount of fumes exhausted from large vehicles such as trucks and the like must have a large volume, and further must have a large sectional area to reduce a pressure loss. However, a honeycomb structure having a large sectional area has a problem in that the partition walls of cells cannot endure the weight of the honeycomb structure itself and are deformed in the outer periphery of the honeycomb structure (refer to patent document 1).

To prevent the reduction of the mechanical strength, there is proposed a method of processing and eliminating the deformed portions of partition walls in the outer periphery of a honeycomb structure after it is formed and fired and forming an outer shell layer constituting the outer surface of the honeycomb structure by filling the recessed grooves of the outer periphery with a ceramic coating, and a honeycomb structure comprising the outer shell (refer to patent document 2). However, this method is disadvantageous in that the temperature increasing speed of the honeycomb structure is reduced at the start of operation because the heat capacity of the honeycomb structure is increased and thus it is difficult for the catalysts carried by the honeycomb structure to be activated in a short time, although the mechanical strength of the honeycomb structure can be enhanced. Further, there is also a problem in that the temperature of the central portion of the honeycomb structure is different from that of the outer periphery thereof. The occurrence of the temperature difference is not preferable because when the honeycomb structure is used as a catalyst carrier and a filter, catalysts are activated and the filter is recycled unevenly, respectively. Further, the occurrence of the temperature difference is also not preferable in that it may cause cracks to be generated in the honeycomb structure.

Further, there is a proposal for improving the accuracy of the outside diameter of a honeycomb structure which has partition walls and outer peripheral wall formed integrally by extrusion, by disposing a covering layer around the outer peripheral surface thereof (refer to patent document 3). The proposal discloses a method of suppressing the breakage of the honeycomb structure caused by the reduction of mechanical strength thereof in canning due to the reduced partition wall thickness by reducing canning surface pressure by properly setting the range of clearance in the canning by improving the accuracy of the outside diameter of the honeycomb structure. Although the means for forming the covering layer around the outer peripheral surface of the honeycomb structure, which has the partition walls and the outer peripheral wall made integrally, can improve the canning resistant property of the honeycomb structure, a problem arises in that the heat capacity of an outer wall part is increased and the heat in the honeycomb structure escapes to the outside wall thereof, the problem being the same as that occurring in the above-mentioned honeycomb structure whose outer periphery is coated with the ceramic cement.

Patent document 1: JP-A-3-275309
Patent document 2: JP-A-5-269388
Patent document 3: JP-U-63-144836

DISCLOSURE OF THE INVENTION

An object of the present invention, which was made in view of the above problems, is to provide a honeycomb structure capable of suppressing the reduction of a temperature increasing speed of the honeycomb structure while suppressing the reduction of mechanical strength thereof and further capable of suppressing the occurrence of cracks and to provide a method of manufacturing the honeycomb structure.

The present invention provides a honeycomb structure including a honeycomb structural part, which has partition walls for forming a plurality of cells partitioned in a honeycomb shape and recesses on an outer peripheral surface, and an outer wall part disposed on the outer peripheral surface of the honeycomb structural part, wherein voids are formed in the recesses between the outer wall part and the honeycomb structural part.

In the present invention, it is preferable that the average contact ratio of the outer wall part and the honeycomb structural part in the recesses be 0.9 or less, further 0.7 or less, and in particular 0.3 or less. It is preferable that the honeycomb structural part and the outer wall part be composed of a ceramic material and that an interface exist in the boundary between the outer wall part and the honeycomb structural part. It is preferable that the honeycomb structural part contain a material having an absorption function and/or a catalyst function. It is preferable that at least a part of the cells be plugged at edges and used as a filter. It is preferable that catalysts be carried in the cells and/or in the partition walls and that the catalysts have a function for purifying auto exhaust fumes.

The present invention also provides a method of manufacturing a honeycomb structure which includes a step of obtaining a formed body by forming which has partition walls for forming a plurality of cells partitioned in a honeycomb shape, a step of drying the formed body, a step of obtaining a fired body by firing the formed body, and a step of forming an outer wall part by disposing a coating material on the outer peripheral surface of the formed body or the fired body, wherein the coating material is disposed so as to form voids in at least a part between the outer peripheral surface and the outer wall part at the step of forming the outer wall part.

In the present invention, it is preferable to include a step of processing and eliminating at least a part of the outer periphery of the formed body or the fired body prior to the step of forming the outer wall part, and it is more preferable that the step of processing and eliminating the outer peripheral part be executed prior to the step of firing the formed body or that the step of processing and eliminating the outer peripheral part be executed after the step of firing the formed body. It is preferable that a formed body including an outer peripheral wall integrated with the partition walls be obtained at the step of obtaining the formed body and that the outer peripheral part including the outer peripheral wall be processed and eliminated at the step of processing and eliminating the outer peripheral part. It is also preferable that a formed body not including the outer peripheral wall be obtained at the step of obtaining the formed body and that the outer peripheral part be formed by disposing the coating material on the outer peripheral surface of the formed body or the fired body without processing and eliminating the outer peripheral part of the formed body or the fired body. It is preferable that an organic material be disposed on the outer peripheral surface of the formed body or the fired body at the step of forming the outer peripheral wall and that voids be formed in at least a part between the outer peripheral surface and the outer peripheral part by removing the organic material after disposing the coating material on the organic material, and it is also preferable to use a coating material whose viscosity is adjusted so as to form voids in at least a part between the outer peripheral surface and the outer peripheral part of the formed body or the fired body at the step of forming the outer wall part. Further, it is preferable to include a step of plugging the edges of at least a part of cells prior to the step of firing the formed body, and it is also preferable to include a step of plugging the edges of at least a part of cells after the step of firing the formed body and to execute second firing after the plugging step.

According to the honeycomb structure of the present invention, the provision of the outer wall part can suppress a decrease in the temperature increasing speed of the honeycomb structure which is a drawback caused by providing the outer wall part while suppressing a decrease in the mechanical strength of the honeycomb structure, thereby the occurrence of cracks can be suppressed. The above-described honeycomb structure can be easily produced by a process for production of the honeycomb structure of the present invention.

DESCRIPTION OF REFERENCE NUMERALS

1 . . . honeycomb structure, 2 . . . partition wall, 3 . . . cell, 4 . . . honeycomb structural part, 5 . . . outerwall part, 6 . . . recess, 6a, $6a_1$, $6a_2$ . . . bottom of recess, 7 . . . void, 8 . . . crack, 9 . . . corner part, 10 . . . organic substance, 11 . . . coating material 42, 44 . . . edge part

BEST MODE FOR CARRYING OUT THE INVENTION

Although examples of the present invention will be described in detail with reference to the drawings, the present invention is by no means limited thereto. Note that, in the following description, a section means a section vertical to the path direction of cells (lengthwise direction) unless otherwise specified.

Figure 1A:
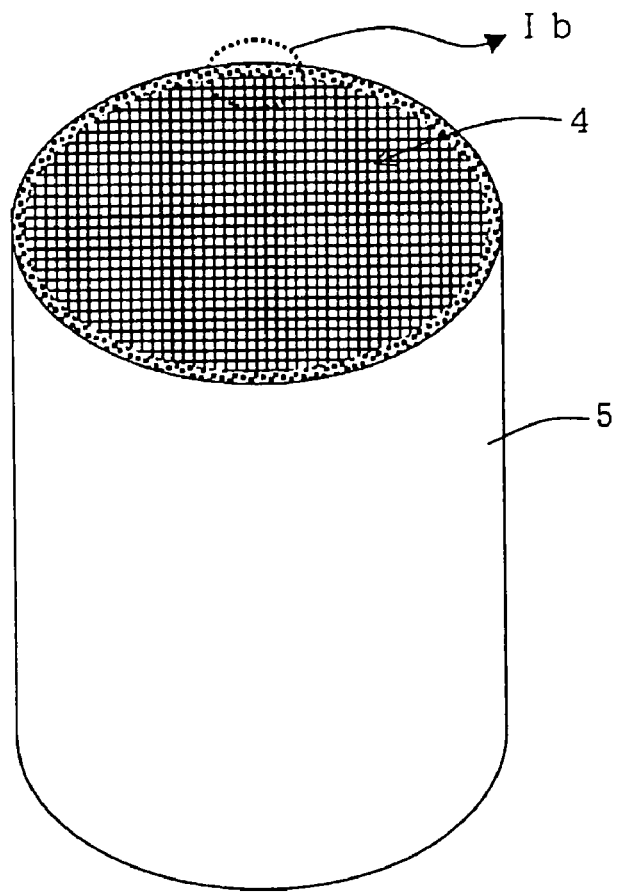
FIG. 1(a) is a schematic perspective view showing an example of a honeycomb structure of the present invention.
Figure 1B:
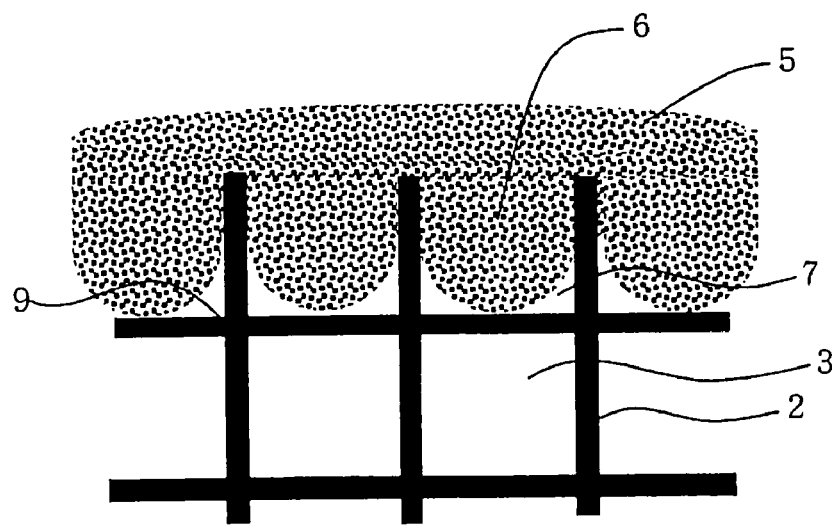
FIG. 1(b) is a partial enlarged view showing Ib in FIG. 1(a).
Figure 2A:
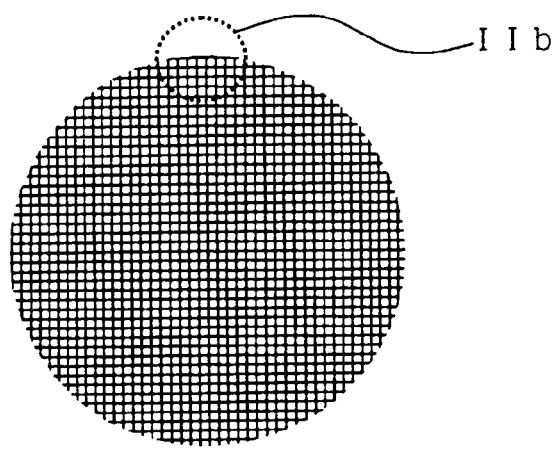
FIG. 2 (a) is a schematic plan view showing a honeycomb structural part according to the present invention.
FIG. 2(b) is a partial enlarged view showing IIb in FIG. 2(a).
Figure 2B:
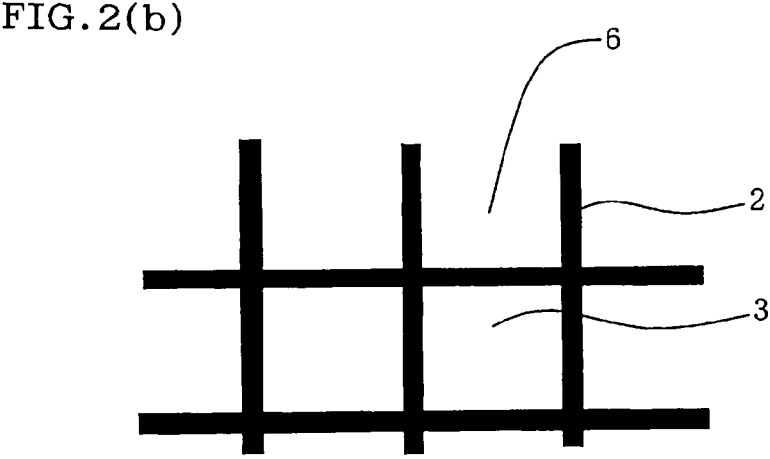

FIG. 1(a) is a schematic perspective view showing one example of a honeycomb structure of the present invention, and FIG. 1(b) is a partially enlarged view of the portion Ib of FIG. 1(a). FIG. 2(a) is a schematic plan view showing an example of a honeycomb structural part according to the present invention, and FIG. 2(b) is a partially enlarged view of a part IIb of FIG. 2(a). A honeycomb structure 1 shown in FIGS. 1(a) and (b) includes the honeycomb structural part 4 and an outer wall part 5. The honeycomb structural part 4 includes partition walls 2 as shown in FIGS. 2(a) and (b). The partition walls 2 form a plurality of cells 3 partitioned in a honeycomb shape as well as forms recesses 6 extending in the lengthwise direction of the cells 3 in a groove shape on the outer periphery thereof. In the honeycomb structure 1 shown in FIGS. 1(a) and (b), voids 7 are formed between the outer wall part 5 and the honeycomb structural part 4 in the recesses 6.

Figure 7A:
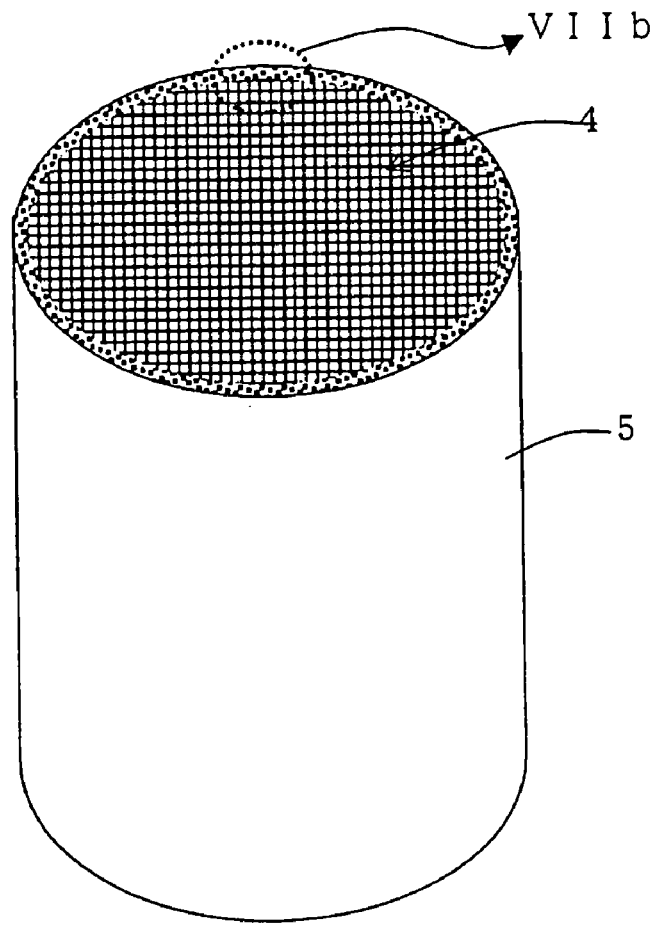
FIG. 7(a) is a schematic perspective view showing an example of a conventional honeycomb structure.
Figure 7B:
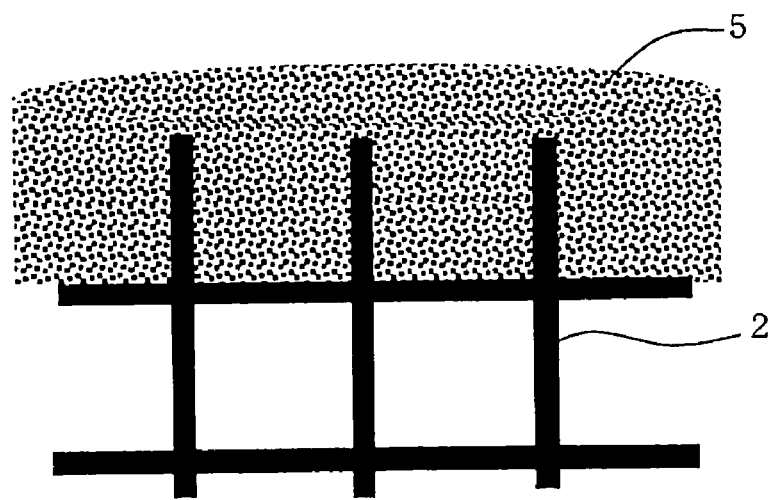
FIG. 7(b) is a partially enlarged view of a part VIIb of FIG. 7(a).
Figure 8A:
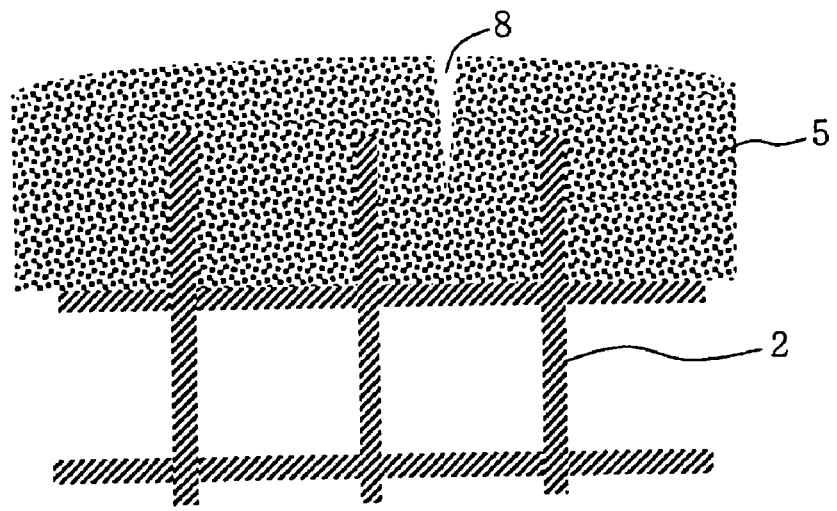
FIG. 8(a) is a schematic sectional partially enlarged view showing a state in which cracks are generated in a conventional honeycomb structure.
Figure 8B:
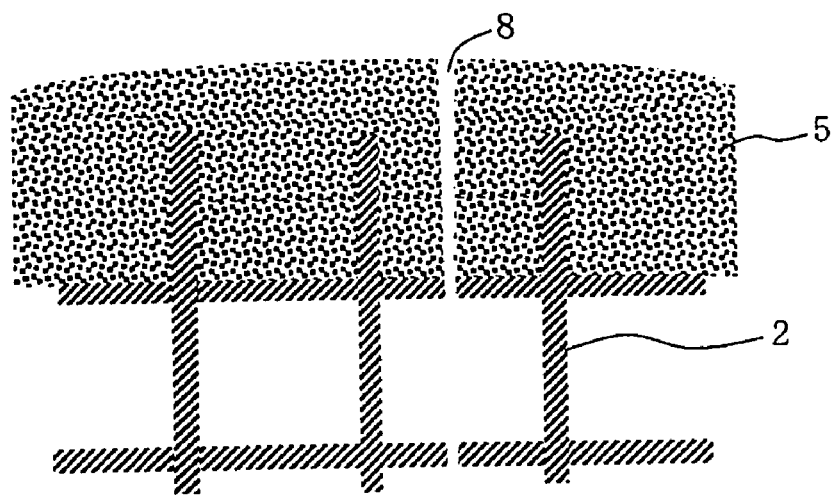
FIG. 8(b) is a schematic sectional partially enlarged view showing a state in which cracks are generated in the a conventional honeycomb structure.

FIGS. 7(a) and (b) show a conventional honeycomb structure in which an outer wall part 5 has a large heat capacity and is in contact with a honeycomb structural part 4 in a large area. Accordingly, when it is intended to use the honeycomb structure to treat auto exhaust fumes and to heat and increase the temperature of the honeycomb structural part 4 by the heat of the exhaust fumes, the heat of the honeycomb structural part 4 is liable to escape to the outside. Accordingly, the temperature increasing speed of the honeycomb structure is reduced as well as a temperature difference occurs in that the central portion of the honeycomb structure has a high temperature and the outer periphery thereof has a low temperature. As a result, the amount of thermal expansion of the outer wall part 5 is relatively smaller than that of the honeycomb structural part 4. Further, in the conventional honeycomb structure, since the outer wall part 5 is in intimate contact with the honeycomb structural part 4 through the entire boundaries thereof, stress is caused by the difference between the thermal expansions of the honeycomb structural part 4 and that of the outer wall part 5 as the temperature of the honeycomb structural part 4 increases. As a result, cracks are liable to be generated on the surface of the outer wall part 5 in a peripheral direction or in the path direction of cells. Further, when a crack 8 as shown in FIG. 8(*a*) is generated on the outer wall part 5, the force for opening the crack 8 also propagates to the honeycomb structural part, and thus the crack 8 is also liable to propagate to the partition walls 2 of the honeycomb structural part.

Figure 3A:
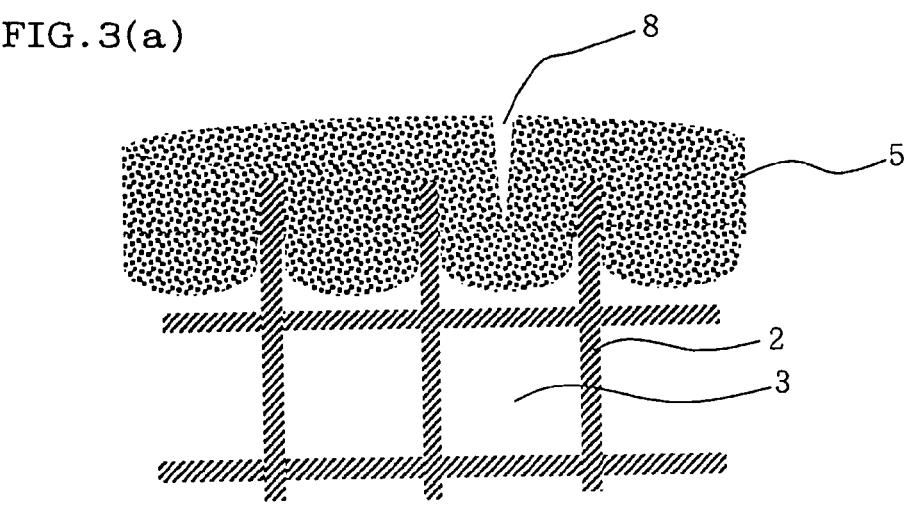
FIG. 3(a) is a schematic sectional partially enlarged view showing a state in which cracks are generated in the example of the honeycomb structure of the present invention.
Figure 3B:
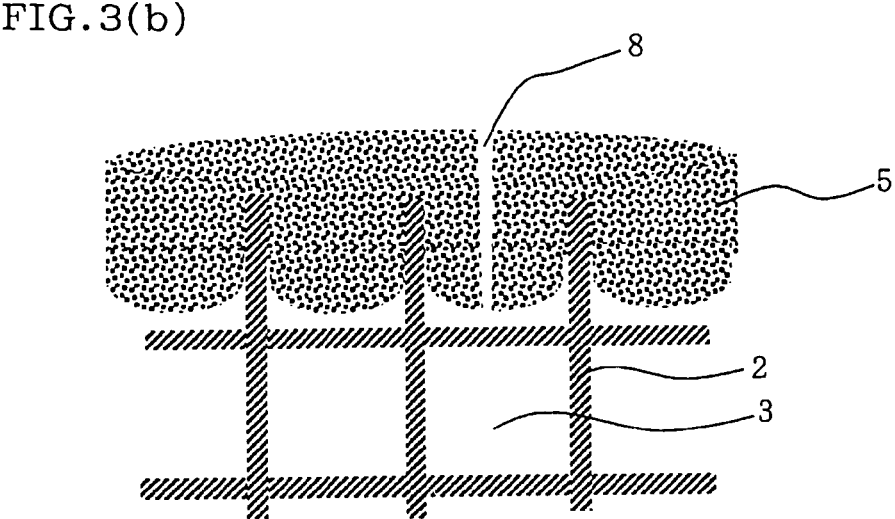
FIG. 3(b) is a schematic sectional partially enlarged view showing a state in which cracks are generated in the example of the honeycomb structure of the present invention.

In contrast, in the honeycomb structure 1 shown in FIGS. 1(*a*) and (*b*), since the voids 7 are formed in the recess 6, the volume of the outer wall part 5 is reduced so that the heat capacity thereof is reduced as well as the area of the outer wall part 5 in contact with the honeycomb structural part 4 is reduced and the voids 7 act as a heat insulation layer. Therefore, the heat of the honeycomb structural part 4 is unlike to escape to the outside. As a result, even if the honeycomb structure includes the outer wall part 4, the reduction of the temperature increasing speed is suppressed as well as the temperature difference between a central portion and a peripheral portion is reduced. Thus, the difference between the amounts of thermal expansion of the outer wall part 5 and that of the honeycomb structural part 4 is reduced, which can suppress the cracks generated to the outer wall part 5 by the difference between the thermal expansions. Further, even if a crack 8 as shown in FIG. 3(*a*) is generated to the outer wall part 5, the propagation of the crack 8 from the outer wall part 5 to the partition walls 2 of the honeycomb structural part can be suppressed by the existence of the voids 7 as shown in FIG. 3(*b*).

The size of the voids 7 is not particularly limited and is preferably set to a size by which any of the effects as described above can be obtained even if only slightly. Further, as shown in FIGS. 1(*b*) and 4(*a*), it is also preferable to dispose the voids 7 such that corner parts 9 as the intersections of the partition walls 2 are not in intimate contact with the outer wall part 5. An effect of easing that the outer wall part 5 is restrained in the recess 6 can be obtained by disposing the voids 7 as described above. Further, there can be obtained an effect of suppressing that cracks are generated in the peripheral direction of the outer wall part by tensile stress in a cell path direction due to the difference between the thermal expansions of the outer wall part 5 and the honeycomb structural part in the cell path direction. Even if the voids 7 have a small size, there is an effect of suppressing the generation of the cracks by disposing the voids as described above. When the size of the voids 7 is shown by a contact ratio (C), an average contact ratio of about 0.95 is preferable because an effect of suppressing crack can be obtained thereby. However, it is more preferable to set the average contact ratio to 0.9 or less.

Figure 4A:
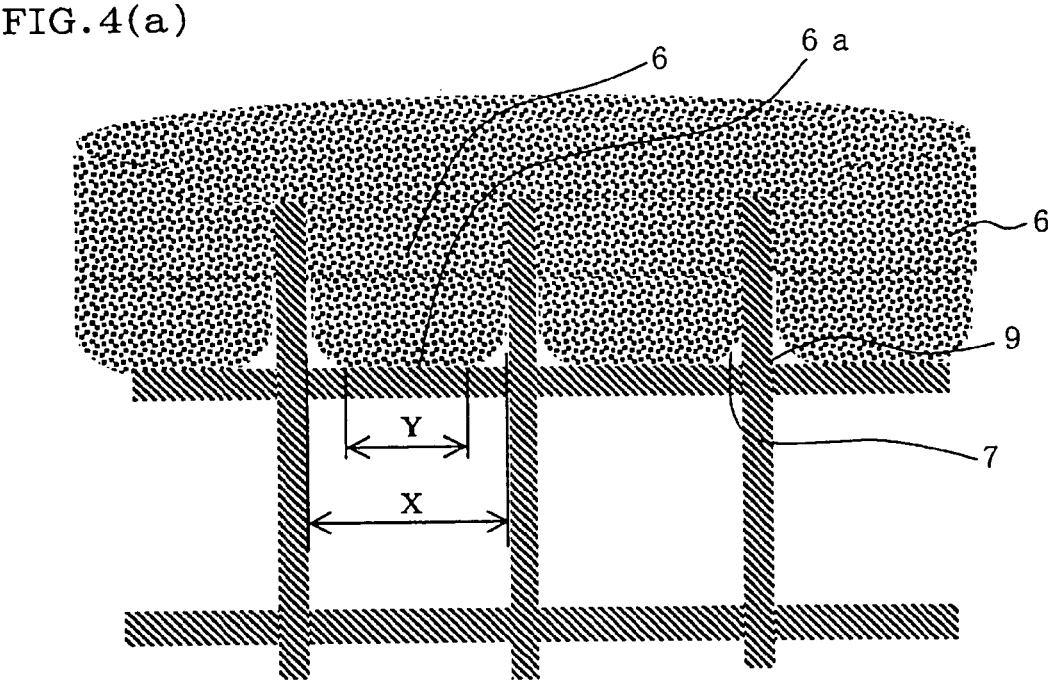
FIG. 4(a) is a schematic sectional enlarged view showing another example of a honeycomb structure of the present invention.

As shown in FIG. 4(*a*), the contact ratio (C) means the ratio (X/Y) of the length (Y) of the portion of the outer wall part 5 in contact with the bottom part 6*a* of the recess 6 to the length (X) of the bottom part (6*a*). Note that since the bottom part of the recess also includes the part where the open area of the recess is narrowed, when the recess 6 is formed to have a V-shaped cross section, as shown in FIG. 4(*b*), the length (X) of the bottom part is the total length of the respective lengths $X_1$, $X_2$ of the two bottom parts 6*a*$_1$, 6*a*$_2$, and the length (Y) is the total of the respective lengths $Y_1$, $Y_2$ of the portions of the outer wall part 5 in contact with the two bottom parts 6*a*$_1$, 6*a*$_2$. Accordingly, the contact ratio (C) is shown by $C=(Y_1+Y_2)/(X_1+X_2)$.

Further, the average contact ratio is preferably 0.7 or less and more preferably 0.3 or less. Since a heat insulation effect is enhanced by reducing the average contact ratio as described above, even if the temperature of the honeycomb structural part is changed abruptly, heat is unlike to conduct from the honeycomb structural part to the outer wall part. Accordingly, since the temperature of the honeycomb structural part is increased rapidly, when catalysts are carried by the honeycomb structure, the catalysts can be activated promptly. As a result, as the average contact ratio is reduced, an HC (hydrocarbon) purification effect can be enhanced. Since this effect outstandingly appears particularly in a large honeycomb structure having a thin wall for purifying diesel exhaust fumes, the present invention can be preferably applied to the large honeycomb structure having the thin wall. Further, as the average contact ratio is reduced, since the volume of a coating material filling the recesses between the partition walls is reduced, it is contemplated that the reduction of the heat capacity of the outer wall part affects prompt activation. Accordingly, as shown in FIGS. 3(*a*) and (*b*), even if the average contact ratio is set to 0, it is preferable to reduce the volume of the outer wall part in the recesses between the partition walls and the thickness of the outer wall part as much as possible. Further, the propagation of the cracks generated to the outer wall part in the cell path direction to the honeycomb structural part can be suppressed by reducing the average contact ratio as described above, in particular, by setting it to about 0.3 or less.

A ceramic material and a metal material can be preferably used as the main component of the honeycomb structural part, and a ceramic material can be preferably used as the main component of the outer wall part. The ceramic material includes at least one kind selected from cordierite, alumina, mullite, lithium, aluminum, silicate, aluminum titanate, titania, zirconia, silicon nitride, aluminum nitride, and silicon carbide and the composites thereof. Further, the honeycomb structural part may include materials such as activated carbon, silica gel, zeolite, and the like having an absorption function and/or a catalyst function. Further, it is also preferable to use the metal material as the main component of the honeycomb structural part. This is because the effect of the example that the temperature of the inner peripheral cells of the honeycomb structural part is increased in a short time without escaping heat outstandingly appears because the metal material has high thermal conductivity and a large amount of heat escapes to the outer wall part. It is preferable that the outer wall part contain ceramic fibers and amorphous oxide matrices existing therebetween (matrices formed of for example, colloidal silica or colloidal alumina), in addition to the particles, for example, cordierite particles of the ceramic material described above. Further, the outer wall part may contain a highly heat resistant material such as SiC particles and the like to provide the outer peripheral wall with a heat resistant property. Moreover, the outer wall part may include materials such as activated carbon, silica gel, zeolite, and the like having an absorption function and/or a catalyst function. A cement material formed by combining various materials can be used as described above. The main component used here means a material constituting at least 80 mass % of the respective parts.

Figure 5:
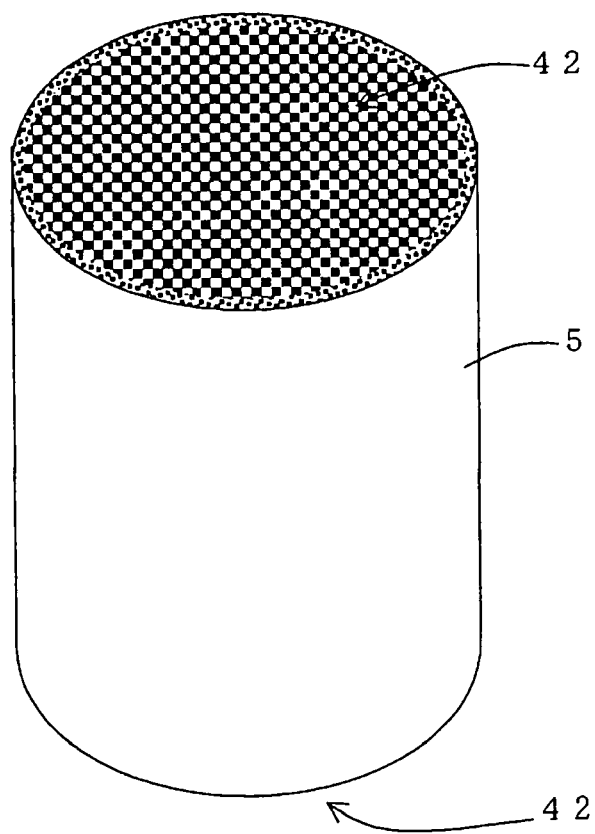
FIG. 5 is a schematic perspective view showing another example of the honeycomb structure of the present invention.

In the honeycomb structure of the present invention, it is preferable that at least a part of the cells of the honeycomb structure are plugged in the edges thereof and that the honeycomb structure is used as a filter. Further, as shown in FIG. 5, when the cells are alternately plugged on both the edges 42 and 44 thereof so that they exhibit a checkered pattern, since the fluid, which flows into the honeycomb structure, entirely passes through the partition walls of the cells, the honeycomb structure can be preferably used as the filter. When the honeycomb structure is used as the filter, although the partition walls of the honeycomb structural part must be composed of a porous material, the ceramic material described above can be preferably used to the partition walls. In particular, when the honeycomb structure is used to capture soot exhausted from a diesel engine, the honeycomb structure may be recycled by burning and eliminating the captured soot. In this case, a problem arises in that the soot remains without being burnt because the filter is liable to be made to a relatively low temperature in the outer periphery thereof, in particular, in the vicinity of the fume exhaust port thereof. Since the problem is also caused by the heat escaping to the outer wall part, the honeycomb structure of the present invention is effective to suppress the soot remaining without being burnt by the heat insulation effect of the voids of the honeycomb structure of the present invention. Accordingly, the honeycomb structure of the present invention is preferably used as the filter.

In the honeycomb structure of the present invention, it is preferable that the catalysts be carried on the inner surfaces of the fine holes in the cells (surfaces of the partition walls) and/or in the partition walls. The honeycomb structure is preferably used to purify exhaust fumes by absorbing and attaching, or absorbing gas components such as HC, NOx, CO, and the like and/or particulate emissions such as solid components having carbon cores, SOF, and the like contained in the exhaust fumes emitted from an internal combustion engine such as auto exhaust fumes. When honeycomb structure of the present invention is used as described above, since a temperature increasing speed is particularly important to promptly activate the catalysts, the honeycomb structure of the present invention is more advantageous for this purpose. Precious metals such as Pt, Pd, Rh, and the like, alkali metals, alkali-earth metals, rare earths, and the like are exemplified as preferable catalysts, and it is preferable to carry one kind or at least two kinds of them in the cells and/or in the partition walls. When a coating layer is formed by thinly coating γ alumina having a high specific surface area in, for example, the cells and/or in the partition walls in a thickness from several microns to several tens of microns and the above catalysts, for example, Pt particles and Pd particles are carried on the surfaces of the fine holes in the alumina, HC in the exhaust fumes passing through the insides of the cells and/or the partition walls can be effectively oxidized.

The sectional shape of the honeycomb structure of the present invention is not particularly limited, and it may be formed in an oval shape and an irregular shape in addition to a circular shape. Although the sectional area of the honeycomb structure is not particularly limited, since the present invention can be more suitably applied to the large honeycomb structure as described above, it is preferable that the honeycomb structure have a sectional area corresponding to a circle having a diameter of 100 mm or more and in particular 130 mm or more. The sectional shape of the cells is not particularly limited and may be any of a triangle, square, hexagon, circle, and the like. There is no particular restriction as to the thickness of the partition wall, and the thickness may be in a range of, for example, 30 to 2000 μm, preferably 40 to 1000 μm, more preferably 50 to 500 μm. In particular, since the present invention can be suitably applied to a honeycomb structure having thin partition walls, a honeycomb structure having a partition wall thickness of 130 μm or less, in particular, 80 μm or less is a particularly suitable mode. The partition wall is preferably porous, and a porosity of, for example, 30 to 90% by volume is There is no particular restriction as to the cell density (the number of cells per unit sectional area). For example, the cell density can be in a range of 6 to 2000 cells/square inch (0.9 to 311 cells/cm$^2$), preferably 50 to 1000 cells/square inch (7.8 to 155 cells/cm$^2$), and further preferably 100 to 400 cells/square inch (15.5 to 62.0 cells/cm$^2$).

A manufacturing method for a honeycomb structure of the present invention is described in more detail below with reference to the concrete embodiments. In a specific example, first, a raw material is made to clay. That is, a main component, which is suitable for the honeycomb structural part, or a raw material, which is suitable to form the main component, for example, a cordierite-making raw material which is made to cordierite by being fired and silicon carbide powder, metallic carbide powder, and the like for forming a silicon carbide-metallic silicon composite are added with binders, for example, methyl cellulose and hydroxy propoxyl methyl cellulose and further added with an interfacial active agent and water, and kneaded so that they are made to clay. The cordierite-making raw material is obtained by preparing talk, kaoline, calcined kaoline, alumina, aluminium hydroxide, silica, and the like at a predetermined ratio so that a resultant chemical composition is within the range of SiO$_2$: 42-56 mass %, Al$_2$O$_3$: 30-45 mass %, MgO: 12-16 mass %.

Next, a formed body including the partition walls for forming a plurality of cells partitioned in a honeycomb shape is obtained by forming the clay. Although a method of forming the clay is not particularly limited, it is ordinarily preferable to subject the clay to be formed by extrusion, and a plunger type extruder, a twin screw type continuous extruder, and the like are preferably used. When the twin screw type continuous extruder is used, the mixing step to form clay and forming step can continuously be carried out. At the time, although the clay may be formed so as not to include an outer peripheral wall, it is also preferable that the clay is formed to the formed body including the outer peripheral wall integrated with the partition walls from a view point of suppressing the deformation of the partition walls.

Next, the obtained formed body is dried, for example, by microwaves, dielectric heating and/or hot air, and subsequently fired by a firing step to obtain a fired body. A firing temperature and atmosphere in the firing step can be changed appropriately in accordance with the raw material for use, and any person skilled in the art can select the firing temperature and atmosphere optimum for the raw material for use. For example, when the cordierite forming raw material is used, the formed body is heated to degrease in the air, subsequently fired in the air at a maximum temperature of about 1400 to 1450 degree C. When the silicon carbide powder and metal silicon powder are used as the raw material, the formed body can be heated to degrease in the air or an N$_2$ atmosphere, subsequently fired in an Ar atmosphere at about 1550 degree C. A single kiln or a continuous furnace such as a tunnel kiln is generally used in the firing, and the degreasing and firing can be carried out in the furnace at the same time or continuously.

Next, at least a portion, preferably, the entire outer periphery of a fired body is processed and eliminated as necessary.

Although this process is not essential, since the partition walls of the formed body may be deformed in the vicinity thereof prior to this process, it is preferable to eliminate the partition walls in the vicinity of the outer periphery. Further, when a formed body including an outer peripheral wall integrated with partition walls is obtained in the process for obtaining the formed body, the outer peripheral wall must be eliminated. It is preferable also in this case to eliminate the outer peripheral wall together with the partition walls in the vicinity of the outer peripheral wall. Further, the process for eliminating at least a portion of the outer periphery may be executed to the formed body before it is fired. As a range in which the outer periphery is eliminated, the outer periphery of the formed body or the fired body is preferably processed and eliminated so as to preferably eliminate, for example, at least two cells from the outer periphery and to more preferably eliminate, for example, two to four cells therefrom. When the cells are eliminated, a coating material can be easily disposed so as to form voids in the recesses 6 in a coating material disposing process, which will be described later, by processing and eliminating the cells so that the groove-shaped recesses 6 extending in the cell path direction are formed on the outer peripheral surface of the formed body or the fired body as shown in FIGS. 2(a) and (b). Note that the outer periphery eliminating process may not be necessary in the process for obtaining a formed body by obtaining the formed body formed in a shape having no outer peripheral wall as shown in FIGS. 2(a) and (b). Accordingly, it is also preferable to obtain a formed body which includes no outer peripheral wall and to execute an outer wall part forming process to be described later without processing and eliminating an outer wall part.

Next, the outer wall part is formed by disposing the coating material around the outer periphery of the fired body. At the time, the coating material is disposed such that the voids are formed between at least a portion of the outer peripheral surface of the fired body and the outer wall thereof. At the time, the voids 7 having a shape as shown in FIG. 1(b) can be easily formed by the recesses 6 existing on the outer peripheral surface of the fired body as shown in FIGS. 2(a) and (b). The formed body may be subjected to an outer peripheral wall forming process before a process for firing it. In this case, an outer periphery processing and eliminating process, which is executed as necessary, is applied to the formed body before the coating material is disposed thereto because the above process must be executed in a process before the coating material is disposed.

The coating material preferably contains at least one kind selected from the materials exemplified above as the ceramic materials suitable for the main component of the outer wall described above and more preferably contains the same kind of ceramic particles as those of the main component of the honeycomb structural part. Exemplified as specific examples of the ceramic particles are, for example, cordierite, alumina, mullite, lithium, aluminum silicate, aluminum titanate, titania, zirconia, silicon nitride, aluminum nitride, silicon carbide, and the like. The coating material preferably contains colloidal silica and/or colloidal alumina in addition to the ceramic particles, further preferably contains the ceramic fiber, still further preferably contains the inorganic binder, and still further preferably contains an organic binder. Preferably, liquid components such as water are added to such raw materials to obtain slurry, and the slurry is applied as the coating material.

Figure 4B:
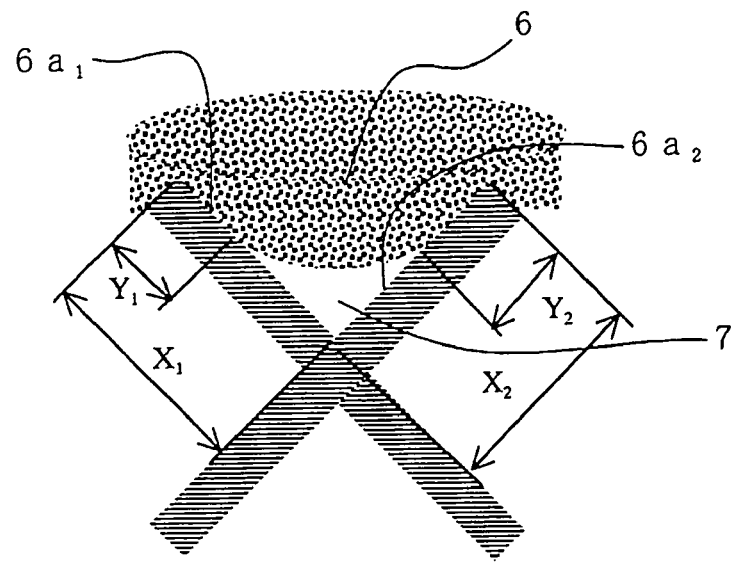
FIG. 4(b) is a schematic sectional enlarged view showing another example of a honeycomb structure of the present invention.

At the time, as a mode in which the formed body or the fired body has the recesses around the outer periphery thereof, the voids 7 can be suitably formed by adjusting the viscosity of a slurry as the coating material so that the voids are formed in the recesses 6, that is, the slurry is not in contact with the entire bottom parts 6a of the recesses, in particular, with the corner parts 9 as shown in FIG. 4(b).

When the coating material is disposed to the fired body, it is preferable to heat and dry the coating material after it is disposed because the outer peripheral wall can be formed by evaporating a liquid component promptly. For example, when the coating material is dried at a temperature of 80 degree C. or more, the strength of the outer peripheral wall can be increased. Note that a method of disposing the coating material is not particularly limited, and a thermal spray method and the like can be also used in addition to a conventionally used coating method.

Figure 6A:
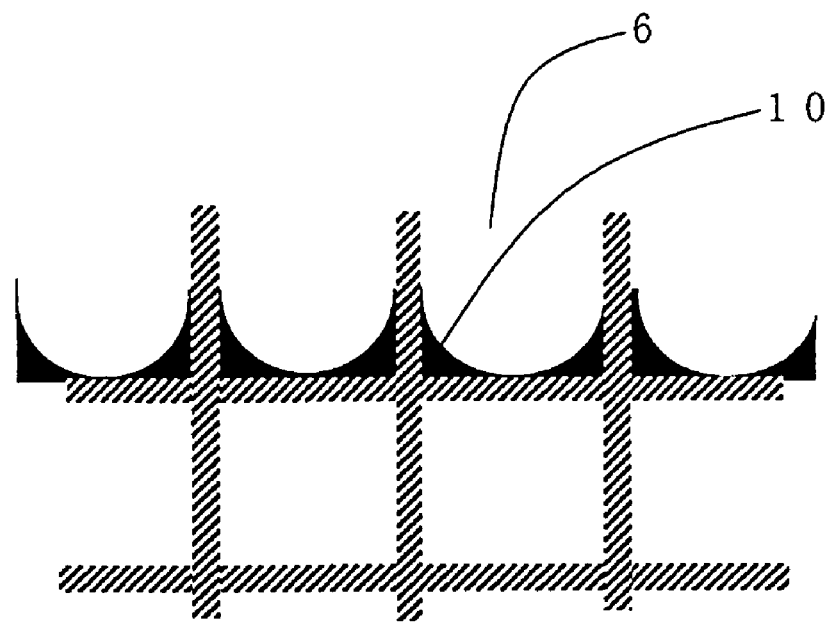
FIG. 6(a) is a schematic sectional enlarged view showing an example of a manufacturing method for a honeycomb structure of the present invention.
Figure 6B:
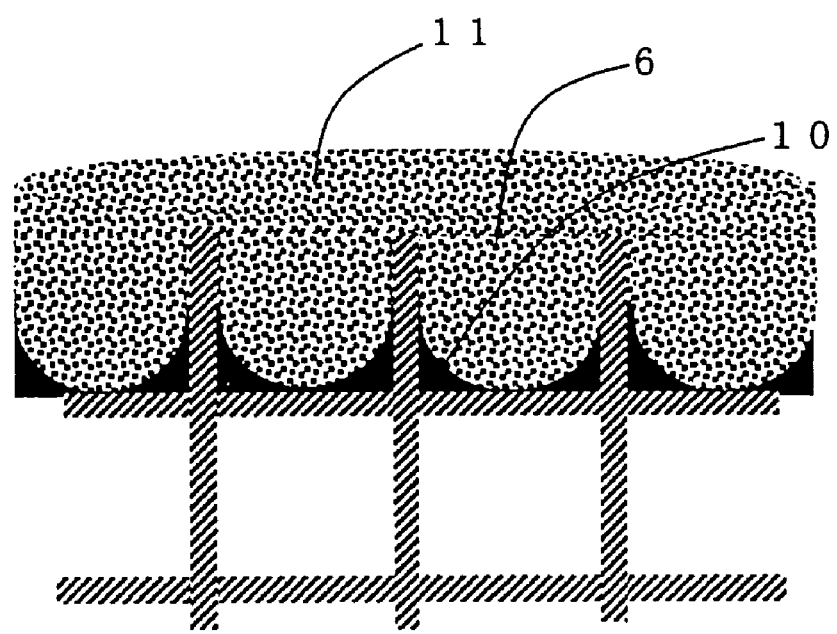
FIG. 6(b) is a schematic sectional enlarged view showing an example of a manufacturing method for a honeycomb structure of the present invention.

The voids can be also suitably formed by disposing an organic material 10 on the outer peripheral surface of the formed body or the fired body, in particular, on the outer peripheral surface in the recesses 6 as shown in, for example, FIG. 6(a) before the coating material is disposed in the process for forming the outer peripheral wall and eliminating the organic material 10 after the coating material 11 is disposed on the organic material 10 as shown in FIG. 6(b) Although a method of eliminating the organic material is not particularly limited, a preferable method is to eliminate the organic material by heating so as to liquefy, vaporize, decompose and/or burn it. Otherwise, the organic material may be eliminated by being dissolved by a solvent and the like. It is preferable that the organic material is not fluidized at a room temperature and is fluidized at a relatively low temperature, for example, at 45 degree C. or more. Specifically exemplified as the organic material are fatty acids such as paraffin wax, wax, stearic acid, and the like, acid amides such as stearic acid amide and the like, and esters such as butyl stearete and the like. Further, an organic material which disperses and disappears at a higher temperature, for example, at about 300 to 400 degree C. can be also suitably used, and polymer materials such as plastics and the like which are decomposed and disappear at the temperature can be also suitably used.

The honeycomb structure formed as described above is different from an ordinary honeycomb structure, that is, a honeycomb structure having partition walls and an outer peripheral wall which are integrally formed by being integrally formed by extrusion and dried and formed. In the honeycomb structure of the present invention, when a firing body is not fired after the coating material is disposed on the outer peripheral surface thereof, a physical interface can exist in the boundary between the honeycomb structural part and the outer wall part. Further, even if the firing body is fired after the coating material is disposed on the outer peripheral surface thereof, the interface can exist between the honeycomb structural part and the outer wall part when the materials of both the parts are different from each other. Even if the materials of both the parts are the same, when both of the materials are cordierite, the interface exists between the honeycomb structural part and the outer wall part because the orientation of the honeycomb structural part formed by being formed by extrusion is different from that of the outer peripheral wall formed by disposition. Even if both the materials are the same material other than cordierite, there can ordinarily exist a systematic interface due to the difference of fine holes and crystal particles resulting from a slightly different composition and a different forming process and a chemical interface due to a different distribution of elements, and the like. In contrast, these interfaces do not exist in the ordinary honeycomb structure because it is formed of the same material by the same forming process. Accordingly, although it is difficult to strictly distinguish the outer wall part from the honeycomb structural part in the ordinary honeycomb structure, it is possible to distinguish them from each other in the honeycomb structure formed by the manufacturing method described above.

In the manufacturing method of the honeycomb structure of the present invention, it is also preferable to include a step of bonding a plurality of formed or fired bodies, preferably fired bodies. When this step is included, the formed honeycomb structure is constituted by bonding a plurality of segments which are segmented honeycomb structure, and the resistance to thermal shock is enhanced. There is no particular restriction as to a bonding material for use in the bonding step and, for example, a material similar to the coating material can be used. Although it is preferable to execute the process before the outer wall forming process, when a manufacturing method has a process for eliminating an arbitrary outer periphery, the above process is preferably executed before the process. That is, after bonding a plurality of formed or fired bodies in a predetermined size by the bonding step, the outer periphery is preferably removed to form the cell structural part which has a desired shape.

When the honeycomb structure is used as the filter, in particular, as a DPF and the like, it is preferable to plug the end faces of the openings of a part of the cells with a plug material. Further, as shown in FIG. 5, it is preferable to alternately plug the cells at both the edges 42 and 44 so that they exhibit the checkered pattern. Plugging can be conducted by masking cells that are not to be plugged, applying a slurry-state plugging material to each open end face of segment, and drying and firing the resulting honeycomb structure. The plugging is preferably carried out after the forming step and before the firing step, so that the firing step may be performed only once. The plugging may also be carried out after the firing or at any time after the forming. There is no particular restriction as to a plugging material, but the material similar to the raw material for forming can be used. Further, when the catalysts are carried by the honeycomb structure, the catalysts can be carried in the cells and/or in the partition walls by wash coating a solution or a slurry containing the preferable catalysts described above and heating it.

EXAMPLES

The present invention is described in more detail below by way of Examples. However, the present invention is not restricted to these Examples.

(Formation of Cell Structural Part)

After cordierite-making raw materials, that is, talc, kaoline, alumina and other cordierite-making raw material formed in fine particles were added with a forming assistant agent, a hole making agent, and water and prepared, they were blended and kneaded, and a resultant kneaded material (clay) was formed by extrusion, thereby a honeycomb-shaped formed body was made. Next, after a plug material was introduced to the predetermined openings of the opening ends of cells of the formed body and was dried, the ceramic honeycomb formed body was fired, thereby a honeycomb-shaped fired body (ceramic honeycomb base material) whose predetermined openings were plugged was obtained. Thereafter, the outer periphery of the fired body was eliminated by ginding process so that the outside diameter of the fired body was made smaller than a predetermined size. Thus, there was obtained a honeycomb structural part (cell structure: partition wall thickness; 17 mil (about 430 μm), cell density; 100 cpsi (about 15.5 cells/cm$^2$), cell pith; 2.5 mm) which was composed of partition walls by which a plurality of cells were formed as well as groove-like recesses were formed so as to extend in a cell path direction on the outer peripheral surface of the fired body.

Examples 1 to 4 and Comparative Example 1

Five kinds of coating materials each having a blend ratio and viscosity shown Table 1 were prepared, coated around the outer peripheries of honeycomb structural parts, and subjected to a heat treatment under conditions shown in Table 2, thereby honeycomb structures (diameter 267 mm×length 178 mm, outer wall thickness 0.8 mm) of examples 1 to 4 and comparative example 1) were obtained.

TABLE 1

| COMPONENT | BLEND RATIO OF COATING MATERIAL (MASS PART) | | | | |
| --- | --- | --- | --- | --- | --- |
| | 1 | 2 | 3 | 4 | 5 |
| CORDIERITE POWDER | 55.0 | 60.0 | 60.0 | 63.0 | 64.5 |
| COLLOIDAL SILICA | 17.0 | 18.0 | 18.0 | 19.0 | 19.5 |
| CERAMIC FIBER | 3.2 | 3.2 | 3.2 | 3.2 | 3.2 |
| INORGANIC ADDITIVE | 0.6 | 0.6 | 0.6 | 0.6 | 0.6 |
| ORGANIC ADDITIVE | 0.2 | 0.2 | 0.2 | 0.2 | 0.2 |
| WATER | 26.0 | 22.0 | 18.0 | 14.0 | 12.0 |
| [ABSOLUTE VISCOSITY mPa · s] | 80 | 110 | 150 | 200 | 280 |

TABLE 2

| | COATING MATERIAL TO BE USED | COATING OF ORGANIC MATERIAL | HEAT TREATMENT TEMPERATURE |
| --- | --- | --- | --- |
| COMPARATIVE EXAMPLE 1 | 1 | NIL | 100 DEGREE C. |
| EXAMPLE 1 | 2 | NIL | 100 DEGREE C. |
| EXAMPLE 2 | 3 | NIL | 100 DEGREE C. |
| EXAMPLE 3 | 4 | NIL | 100 DEGREE C. |
| EXAMPLE 4 | 5 | NIL | 100 DEGREE C. |
| EXAMPLE 5 | 1 | PARAFFIN WAX | 400 DEGREE C. |
| EXAMPLE 6 | 1 | PARAFFIN WAX | 400 DEGREE C. |

Note:
Paraffin wax PW-115 (melting point: 47 degree C.) manufactured by Nihon Seiro Co. is used.

Examples 5 and 6

Organic material layers were formed by thinly coating paraffin wax shown in Table 2 in the recesses of the outer peripheral surfaces of honeycomb structural parts before a coating material was coated and then the coating material shown in table 2 was coated on the paraffin wax. Thereafter, the coating material was subjected to a heat treatment under the conditions shown in Table 2 to obtain the honeycomb structures of Examples 5 and 6.

(Measurement of Average Contact Ratio of Outer Wall Part and Honeycomb Structural Part)

Each two of the honeycomb structural parts of the examples 1 to 6 and the comparative example 1 were cut at right angles with respect to a cell path, and the cut surfaces thereof were polished. Thereafter, an average contact ratio was calculated by measuring and evaluating the contact ratios (C) of the cut surfaces to the bottoms of all the recesses of the outer peripheral parts. The results are shown in Table 3. As shown in Table 3, the average contact ratio of the honeycomb structures obtained in the examples 1 to 3, in which the ratio of water to the coating material is decreased while increasing the viscosity, was 0.21-0.75 as compared with that the average contact ratio of the honeycomb structure of the comparative example 1 was 1. Note that it was also confirmed that an increase in the viscosity of the coating material decreases the average contact ratio.

Further, the average contact ratio of the honeycomb structures obtained in the examples 4 to 5, in which a paraffin wax layer was formed on the outer peripheral surface of the honeycomb structural part by thinly coating paraffin wax and then the coating material was coated and subjected to a heat treatment at 400 degree C. and the paraffin wax layer was eliminated, was greatly reduced to 0.02-0.10. It is contemplated that the paraffin wax layer formed as described above was thermally decomposed and burned by the heat treatment executed at 400 degree C., thereby voids could be formed in the boundary between the honeycomb structural part and the coating material.

TABLE 3

|  | SAMPLE 1 | SAMPLE 2 |
| --- | --- | --- |
| COMPARATIVE EXAMPLE 1 | 1 | 1 |
| EXAMPLE 1 | 0.96 | 0.85 |
| EXAMPLE 1 | 0.75 | 0.7 |
| EXAMPLE 1 | 0.5 | 0.47 |
| EXAMPLE 1 | 0.28 | 0.21 |
| EXAMPLE 1 | 0.1 | 0.05 |
| EXAMPLE 1 | 0.07 | 0.02 |

(Evaluation of Honeycomb Structures)

An exhaust fume purification efficiency was measured and a 100-hour durability test was executed as to the respective samples shown in Table 3 using an actual diesel engine. It was confirmed that the occurrence of cracks on the outer wall parts in the peripheral direction thereof was more suppressed in the samples 1 and 2 of the example 1 than in the samples 1 and 2 of the comparative example 1. In the samples 1 and 2 of the example 1, the crack suppression effect of the sample 2 was larger than that of the sample 1, and the cracks of the sample 2 were smaller than those of the sample 1. The HC purification effect of the samples of the examples 2 and 3 was about 5% better than that of the samples of the comparative example. The HC purification effect of the samples of the examples 4, 5, and 6 was about 10% better than that of the samples of the comparative example 1. Further, in the samples of the comparative example 1 and the examples 1, 2, and 3, a phenomenon that cracks generated on the outer wall parts in the cell path direction propagated to the honeycomb structural parts was observed. However, the phenomenon was not observed in the samples of the examples 4, 5, and 6.

Examples 7 to 12 and Comparative Example 2

Honeycomb structures were made using the same coating material as that of the examples 1 to 6 and the comparative example 1 under the same condition except that the cell structure of a cell structural part had a partition wall thickness of 5 mil (about 130 μm), a cell density of 300 cpsi (about 46.5 cells/cm²), and a cell pitch of 1.47 mm and that the size of the honeycomb structure was set to diameter 267×length 178, and the same evaluation was executed. As a result, approximately the same effect as that described above was confirmed.

Examples 13 to 18 and Comparative Example 3

Honeycomb structures were made using the same coating material as that of the examples 7 to 12 and the comparative example 2 under the same condition except that the cell structure of a cell structural part had a partition wall thickness of 4 mil (about 100 μm), a cell density of 300 cpsi (about 46.5 cells/cm²), and a cell pitch of 1.47 mm, and the same evaluation was executed. As a result, approximately the same effect as that described above was confirmed.

Examples 19 and Comparative Example 4

Honeycomb structures were made using the same coating material as that of the example 5 and the comparative example 2 under the same condition except that the cell structure of a cell structural part had a partition wall thickness of 12 mil (about 300 μm ), a cell density of 300 cpsi (about 46.5 cells/cm²), and a cell pitch of 1.47 mm.

Example 20 and Comparative Example 5

Clay was prepared by adding 8 mass parts of methyl cellulose, 25 mass parts of water, and a small amount of an organic solvent to 100 mass parts of mixed powder as a raw material containing 70 mass % of silicon carbide powder having an average particle size of 12 μm and 30 mass % of silicon carbide powder having an average particle size of 0.5 μm and blending and kneading them, and formed bodies were obtained by extrusion forming the clay after the kneading process. The formed bodies were dried at 150 degree C., cell openings were alternately plugged in a checkered pattern, and then the formed bodies were fired at 2200 degree C. in an inert atmosphere after they were subjected to a binder elimination treatment, thereby fired bodies having a honeycomb structure were obtained. Thereafter, the outer peripheries of the fired bodies were eliminated likewise the embodiment 1, and honeycomb structural parts having a partition wall thickness of 12 mil (about 300 μm), a cell density of 300 cpsi (about 46.5 cells/cm²), and a cell pitch of 1.47 mm were obtained. Further, an outer wall part was made likewise the example 4, and silicon carbide honeycomb structures having diameter 144 mm×length 203 mm were obtained (example 20). Honeycomb structures similar to those of the example 20 were obtained except that an outer wall part was made likewise the comparative example 1 (comparative example 5).

(Soot Recycling Test)

The honeycomb structures obtained in the examples 19 and 20 and the comparative examples 4 and 5 were attached to an exhaust fume pipe of a diesel engine, the diesel engine was operated, and about 30 g of soot was deposited on the honeycomb structures by flowing diesel exhaust fumes (about 3 Nm³/min) having a temperature of about 200-300 degree C. into the honeycomb structures. Thereafter, a honeycomb structure recycling test was executed by mounting the honeycomb structures on a gas burner generating no soot and forcibly burning the soot in the filters by flowing exhaust fumes (about 1 Nm³/min) having a temperature of about 600 degree C. into the filters for 10 minutes. As a result, it was confirmed that the soot remaining in the vicinities of outer peripheral parts without being burned was more suppressed in the honeycomb structures obtained in the examples 19 and 20 than those obtained in the comparative examples 4 and 5, and that the soot was burnt uniformly as a whole.

INDUSTRIAL APPLICABILITY

As described above, since the honeycomb structure of the present invention is excellent in a purification efficiency and a recycling efficiency and can also suppress the occurrence of cracks, it can be widely used as a catalyst carrier, a filter, and the like for purifying exhaust fumes. Further, the honeycomb structure manufacturing method of the present invention can be suitably used to manufacture the honeycomb structure described above.

The invention claimed is:

1. A honeycomb structure comprising:
   a honeycomb structural part, which has partition walls for forming a plurality of cells partitioned in a honeycomb shape and for forming recesses on an outer peripheral surface, and
   an outer wall part disposed on the outer peripheral surface of the honeycomb structural part,
   wherein voids are formed in the recesses between the outer wall part and the honeycomb structural part, where the average contact ratio in the recesses between the outer wall part and the honeycomb structural part is 0.9 or less.

2. A honeycomb structure according to claim 1, wherein the honeycomb structural part mainly comprises a ceramic material or a metal material, and the outer wall part mainly comprises a ceramic material.

3. A honeycomb structure according to claim 1, wherein an interface exists in the boundary between the outer wall part and the honeycomb structural part.

4. A honeycomb structure according to claim 1, wherein the honeycomb structural part contains a material having an absorption function and/or a catalyst function.

5. A honeycomb structure according to claim 1, wherein at least a part of the cells are plugged at edges and used as a filter.

6. A honeycomb structure according to claim 1, wherein catalysts are carried in the cells and/or in the partition walls.

7. A honeycomb structure according to claim 6, wherein the catalysts have a function for purifying auto exhaust fumes.

* * * * *